(12) United States Patent
Greuel (10) Patent No.: US 8,546,766 B2
(45) Date of Patent: Oct. 1, 2013

(54) SENSING UV DOSAGE OF A FLUID STREAM (75) Inventor: Georg Greuel, Roetgen (DE)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 13/496,641

(22) PCT Filed: Sep. 24, 2010

(86) PCT No.: PCT/IB2010/054310
§ 371 (c)(1),
(2), (4) Date: Mar. 16, 2012

(87) PCT Pub. No.: WO2011/039687
PCT Pub. Date: Apr. 7, 2011

(65) Prior Publication Data
US 2012/0175524 A1    Jul. 12, 2012

(30) Foreign Application Priority Data

Sep. 29, 2009 (EP) .................................. 09171691

(51) Int. Cl.
*G01J 1/42* (2006.01)
(52) U.S. Cl.
USPC ......................................................... 250/373
(58) Field of Classification Search
USPC ........................................ 250/395, 372, 373
See application file for complete search history.

(56) References Cited

U.S. PATENT DOCUMENTS 4,608,492 A * 8/1986 Burnham ..................... 250/372
5,007,285 A   4/1991 Dahlen et al.

(Continued)

FOREIGN PATENT DOCUMENTS

DE    3739966 A1    6/1989
WO    8201703 A1    5/1982

OTHER PUBLICATIONS

Peter Norlin et al, "A Chemical Micro Analysis System for Measurement of Pressure, Flow Rate, Temperature, Conductivity, UV-absorption and Fluorescence", 1997 IEEE, 1997 International Conference on Solid-State Sensors and Actuators, Chicago, Jun. 16-19, 1997, pp. 507-510.

Shun-Chung Wang et al, High-Power-Factor Electronic Ballast with Intelligent Energy-Saving Control for Ultraviolet Drinking-Water Treatment Systems, IEEE Transactions on Industrial Electronics, vol. 55, No. 1, Jan. 2008, pp. 142-153.

(Continued)

*Primary Examiner* — David Porta
*Assistant Examiner* — Edwin Gunberg (57) ABSTRACT

Devices and Methods for sensing UV dosage of a fluid stream are described. In a first aspect, a device 22 has a first sensor arrangement 44 for measuring a flow speed of the fluid and a second sensor arrangement 50 for measuring an intensity of UV light radiation. A dosage calculation unit 36 calculates a dosage value from measurements of the sensor arrangements 44, 50. The first sensor arrangement includes a resistive electrical component 32 in thermal contact with the fluid. The electrical component 32 may be heated by an electrical current and has a temperature dependent electrical resistance. Thus, the first sensor arrangement may be used to determine the flow speed of the fluid from a cooling rate of the resistive electrical component 32. According to a second aspect, a device 70 includes at least one UV sensor component 76 for measuring an intensity of UV light irradiation. A data storage 82 for storing intensity or dosage values and an electrical power storage 88 are provided. The device is adapted to freely float within the fluid stream. As such, the device 70 may be inserted into a fluid flowing through a channel, and a dosage value may be determined from data stored in the data storage after the device 70 has passed through the channel.

12 Claims, 5 Drawing Sheets

(56) References Cited

U.S. PATENT DOCUMENTS

| | | | |
|---|---|---|---|
| 5,461,236 A * | 10/1995 | Gram et al. | 250/461.1 |
| 5,493,100 A * | 2/1996 | Renger | 219/497 |
| 5,621,214 A | 4/1997 | Sofield | |
| 5,949,155 A * | 9/1999 | Tamura et al. | 307/107 |
| 6,791,092 B2 * | 9/2004 | Hamilton | 250/373 |
| 2004/0061069 A1 | 4/2004 | Scalble et al. | |

OTHER PUBLICATIONS

Ira M. Katz et al, "Digital Temperature Compensation of a Thermistor Flowmeter", Journal of Physics E. Scientific Instruments, IOP Publishing, Bristol, GB, vol. 20. No. 5, May 1, 1987, pp. 561-564.

* cited by examiner

SENSING UV DOSAGE OF A FLUID STREAM

FIELD OF THE INVENTION

The invention relates to a device and a method for sensing UV dosage of a fluid stream.

BACKGROUND OF THE INVENTION

It is known to treat fluids, such as air and water, by ultraviolet (UV) light for disinfection. In order to obtain reliable results, corresponding treatment devices need to ascertain that the fluid to be treated has been irradiated by a sufficient quantity of UV light to ensure a desired level of disinfection.

Measuring a dosage value involves to measure not only an irradiance level, but to also integrate the measured irradiance level over time, and, possibly, over different wavelengths and spatial directions. In the case of a moving irradiated object, such as a fluid stream, dosage measurement additionally has to consider movement of the fluid, e.g. by measuring a flow speed.

US-A-2004/0061069 relates to a fluid treatment system with an UV sensor and an intelligent driver. Within the system, a fluid is irradiated with ultraviolet light. A sensor detects an UV intensity level and a flow of the fluid stream. The intensity is detected by a photodiode. Flow of the fluid stream is detected by a vibration-sensitive microphone. The system further includes an intelligent driver that powers a UV lamp in dependence on measured parameters.

SUMMARY OF THE INVENTION

It is an object of the present invention to provide a simplified device for sensing UV dosage in a fluid stream, which may be manufactured inexpensively in a small size.

This object is solved by a device and a method of using such a device according to the independent claims. Dependent claims refer to preferred embodiments of the invention.

The invention proposes devices according to two different aspects. In a first aspect of the invention, a device includes a flow speed sensor including a resistive electrical component in thermal contact with the fluid. In a second aspect of the invention, a device is adapted to freely float within the fluid stream and comprises data storage and electrical power storage devices.

According to the first aspect of the invention, a device comprises a first sensor arrangement for measuring a flow speed, a second sensor arrangement for measuring an intensity of UV light irradiation and a dosage calculation unit for calculating a dosage value from measurements of the sensor arrangements.

The first sensor arrangement, which is used for measuring the flow speed of the fluid stream, includes a resistive electrical component arranged in thermal contact with the fluid. The resistive electrical component is on one hand electrically heated. On the other hand, due to a measurable temperature dependency thereof, its temperature is determined by its electrical resistance. As will be explained in detail with regard to preferred embodiments, such an electrical component may advantageously be used for measuring the flow speed of the fluid according to the anemometric measuring principle, i.e. from the cooling rate of the electrically heated component. Because of the thermal contact between the resistive component and the fluid, the cooling rate is, inter alia, dependent on the flow speed of the fluid, thus allowing electrical sensing of this parameter.

As will be explained in detail, the resistive electrical component may be a passive component such as a resistor or photo-resistor, or e.g. a semiconductor component such as a diode, photodiode, transistor or phototransistor. In order to obtain significant measurements even for small temperature changes, a high temperature dependency of the electrical resistance is preferred.

As further will become apparent by the description of the preferred embodiment, a further measure to obtain exact flow speed measurements is a small internal thermal resistance between the component and the fluid stream, i.e. a good thermal contact. It is especially preferred that any parasitic thermal resistance from the component is more than 10 times higher than the thermal resistance from the component to the fluid.

The second sensor arrangement is provided for measuring intensity of UV light irradiation. It includes a UV light sensitive electrical component. As will become apparent in connection with the description of preferred embodiments, the UV light sensitive component may be of the same type of component as the resistive electrical component in the first sensor arrangement, e.g. resistor, diode, transistor, or may even be the identical component, i.e. such that both the first sensor arrangement and the second sensor arrangement are connected to the same component. Possible types of components are photo-resistors, e.g. photo-resistive material applied on a substrate by thick film (printing, spraying, dipping) or thin film processing (growing of material by e.g. sputtering, CVD, laser deposition, evaporation, epitactical growth), photodiode or phototransistor, e.g. grown on a substrate, such as a silicone substrate in case of an Si based detector, like SiC, or sapphire in case of sub group III-V semiconductor detectors, like GaP. It is possible to provide one or both of the components as SMD components mounted on a common substrate.

The device further comprises a dosage calculation unit. The dosage calculation unit is connected to the first and second sensor arrangement and is adapted for calculating a dosage value from the measurements of these sensor arrangements. This calculation basically includes calculating instantaneous dosage values by dividing UV intensity measurements by the determined flow speed and integration or summation of these instantaneous values over time. Preferably, the dosage calculation unit may be implemented as a digital calculation circuit, preferably an integrated circuit, such as a microprocessor, microcontroller or FPGA. It should be noted that the dosage calculation unit need not necessarily be arranged in direct physical vicinity of the sensor arrangements, as long as the sensor readings are transmitted to this unit, and may be realized fully or in part by software executed on one or more processors, which may also serve other tasks besides dosage calculation.

The device according to the first aspect of the invention may be manufactured relatively inexpensively, while still providing reliable measurement. Since no mechanical parts are necessary in flow rate measurement, the device is of simple construction and has very good durability.

As explained above, in a preferred embodiment the resistive component included in the first sensor arrangement, if it is also light sensitive, may also be connected to the second sensor arrangement to serve as UV light intensity sensor. In this case it is preferred to provide a shading device, which may selectively shield the light sensitive resistive component from UV light in the fluid stream. The shading device is controllable to be operated in at least a first and a second mode, where in the first mode the component is exposed to UV light from the fluid and in the second mode the component is shield it from UV light from the fluid. The shading device may be a mechanical shading device such as a movable shutter or movable mirror, but may alternatively be implemented as an electrical/optical device, such as a liquid crystal device changing its optical properties in response to electrical driving parameters.

Further, as mentioned above, it is preferred for the first sensor arrangement to measure the flow speed of the fluid from a cooling rate of the resistive electrical component. First, the temperature of the resistive electrical component is determined. In a preferred embodiment, the resistive electrical component is then heated by a heating circuit applying a quantity of electrical power, and its electrical resistance is again determined to obtain its internal temperature. Then, the thermal resistance is determined from the electrical power applied and the temperature change obtained. If dependence of the thermal resistance on the flow speed has been determined in advance by calibration measurements or model calculations, the flow speed may thus be determined.

According to a second aspect of the invention, a device for sensing UV dosage of a fluid stream comprises a sensor arrangement for measuring an intensity of UV light irradiation, a data storage and an electrical power storage. The device is adapted to freely float within the fluid stream. As such, the device is autonomous, i.e. not physically connected to the outside, e.g. by wires, and adjusted in size and specific weight to be able to freely float in the fluid stream.

In order to perform its dosage measurement task, the electrical power storage—e.g. a battery, rechargeable battery, capacitor or other—supplies electrical power for operation of the onboard devices. Sensor data from the sensor arrangement, corresponding to intensity of UV light, are stored in a data storage. Such data storage may involve storing individual sensor readings and, optionally, timing information of these readings, but it is also possible to store one or more values calculated from the individual sensor readings, such as a time integrated (or summed) value of sensor readings.

In a corresponding measurement method, the described autonomous sensing device is inserted in a fluid stream guided through a channel, which may be e.g. a UV treatment plant or device, where it receives a quantity of ultraviolet light. The sensing device, while floating in the fluid stream and passing through the channel, continuously senses UV light irradiation and stores one or more corresponding intensity values in the data storage. After passing through the channel, a total dosage value is determined from data stored in the data storage.

Thus, the device and method according to the second aspect of the invention allow direct measurement of UV dosage. To obtain statistically more reliable values, it is possible to pass the same device through the channel multiple times, or to use multiple autonomous devices passing through the channel once or multiple times. Thus, statistical information such as maximum and, more important, minimum UV dosage as well as mean dosage values may be determined.

According to a preferred embodiment, the device comprises a housing with a UV transparent portion. The housing is preferably sealed against the fluid. The UV transparent portion allows shielding the device from the fluid while the UV sensor may be arranged internally to receive UV light from the fluid.

According to a further preferred embodiment, the sensor arrangement includes multiple UV light sensitive components arranged to be oriented in different spatial directions. Since in exact terms a dosage value would include an integration over all spatial directions, providing multiple UV light sensitive components provides a more accurate measurement.

According to a further preferred embodiment the device comprises a communication unit to communicate data from the data storage. A communication unit may comprise a mechanical connector, such as plug, which is connected after the device has passed the channel once or multiple times. Preferably, the communication unit provides wireless communication, such as radio or optical communication.

In an especially preferred embodiment, the device comprises a coil for generating a voltage from a time-variant magnetic field. This voltage is used to drive one or more of the sensor, the storage device, or the communication unit, or to charge the electrical power storage device. The device may thus be powered externally, especially during communication. For example, it is preferred to read out the data from the device after passing through the channel by generating a time-variant electromagnetic field from a reading device, prompting the device to report its data e.g. by radio communication.

These and other aspects and features of the present invention will become apparent to a skilled person upon review of the following description of specific embodiments of the invention in conjunction with the accompanying figures.

BRIEF DESCRIPTION OF THE DRAWINGS

Embodiments of the present invention will now be described, by way of example only, with reference to the attached figures, wherein.

DETAILED DESCRIPTION OF EMBODIMENTS

Figure 1:
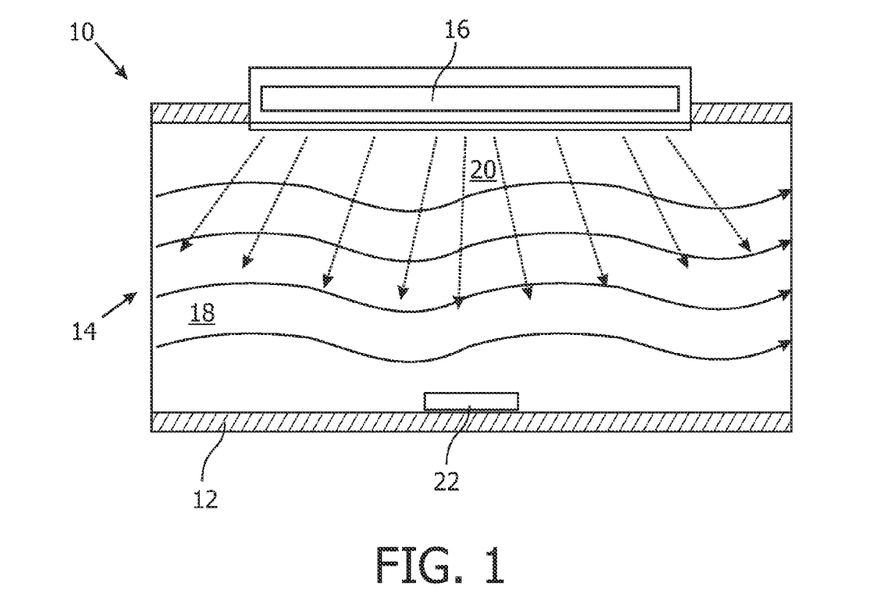
FIG. 1 shows a schematical side view of a UV treatment system.

FIG. 1 shows a UV treatment system 10 including a wall 12 forming a channel 14 through which a fluid, e.g. water or air, is streaming. An UV-lamp 16 is arranged with a window in the channel wall 12 facing the fluid 18, such that UV light 20 from the UV lamp 16 irradiates the fluid 18 flowing through the channel 14.

Arrangements such as the treatment system 10 schematically shown in FIG. 1 are known e.g. for waste water treatment, where contaminated water is irradiated by a UV lamp to inactivate pathogenic microorganisms and thus disinfect the water.

In order to be able to document and guarantee the disinfecting effects of the UV light 20, a dosage measurement of the total radiant photon energy acting on each part of the fluid stream 18 is desirable.

Dosage in UV fluid treatment devices is defined as irradiation energy per surface area, and measured in $J/m^2$ or $mJ/cm^2$. For UVC disinfection for example, a minimum dosage of 40 $mJ/cm^2$ is desirable. The verification of the true dosage in a treatment system 10 is done by biological testing, so-called challenge tests, supported by computer simulation—taking into account the radiation profile of an UV lamp used, the irradiation level at any point within the fluid to be treated, and the flow pattern of the fluid.

Critical to achieve a certain dosage are those parts of a fluid treatment system 10 where either the UV irradiance is low, or the flow speed is high, or both. In the prescribed bio-dosimetric challenge tests, the robustness of a given system is tested by varying flow speed, fluid UV transmission, and other parameters, to guarantee proper function in a specified working area.

In the following, methods and devices for sensing UV dosage will be described which may be used in the development of a fluid treatment system 10 or for monitoring its operation. The proposed sensor provides information on local dosage, which is preferably taken at or close by the critical subareas or subvolumes of low UV irradiance and/or high flow speed.

For this measurement, an electrical sensor 22 is provided in the system 10, which may be arranged as shown in FIG. 1 on the channel wall 12 opposite to the UV lamp 16.

Figure 2:
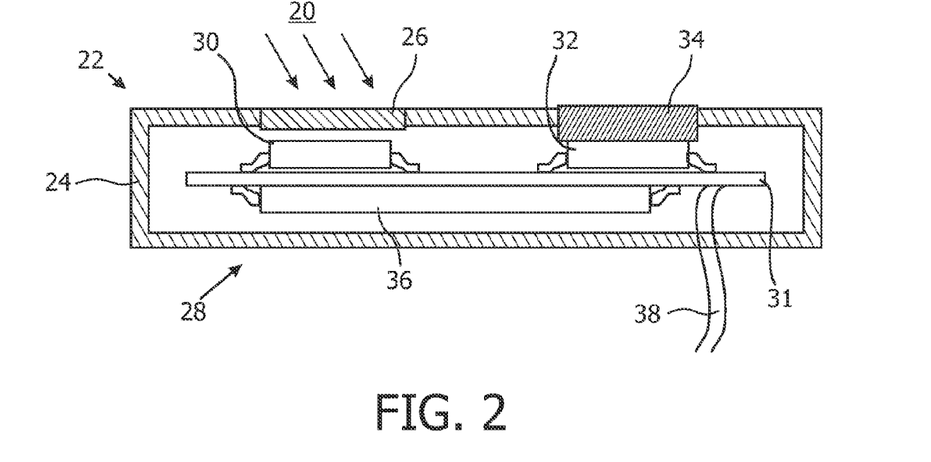
FIG. 2 shows a schematical cross-sectional view of a first embodiment of a UV dosage sensor.

FIG. 2 shows a first embodiment of a UV dosage sensor 22, which includes a housing 24 with a UV transparent window 26 directed towards a fluid stream 18. Arranged within the housing 24 is an electrical circuit 28, where on a printed circuit board PCB 31 a first electrical component 32 and a second electrical component 30 are provided as SMD (surface mounted device) components.

The first electrical component 32 is a component with temperature dependent resistance, such as an NTC or PTC component. A heat conduction element 34 is provided directly on the resistive component 32, which is in direct contact with the exterior of housing 24, and thus with the fluid stream 18. The heat conduction element 34 serves to establish good thermal contact between the fluid stream 18 and the resistive electrical component 32. It is preferably made from a metal with good heat conduction, such as e.g. copper. It should be recognized by the skilled person that the shown shape and design of the housing 24 and especially the heat conduction element 34 is by way of example only and that the shape and size of these may be adapted according to the specific requirements.

The second electrical component 30 is a photo resistor, which reacts to an incident photon stream with a change in resistance. A typical material for such a photo resistor is CdS. The type of material chosen for the photo resistor 30 depends on the spectral composition of the incident light 20. If the spectral composition of the light 20 from the UV lamp 16 is known, and if there are no other light sources, then a generally light sensitive component 30 may be chosen, i.e. a component sensitive not only to UV light but also to other wavelengths.

On the backside of the two-sided PCB 31, an evaluation circuit 36 is provided, which is in the shown example an SMD mounted integrated hybrid circuit, which may alternatively also be realized by a number of discrete electrical components.

A wire connection 38 is provided to the outside of housing 24 for electrical power supply and to transmit sensor data.

Figure 3:
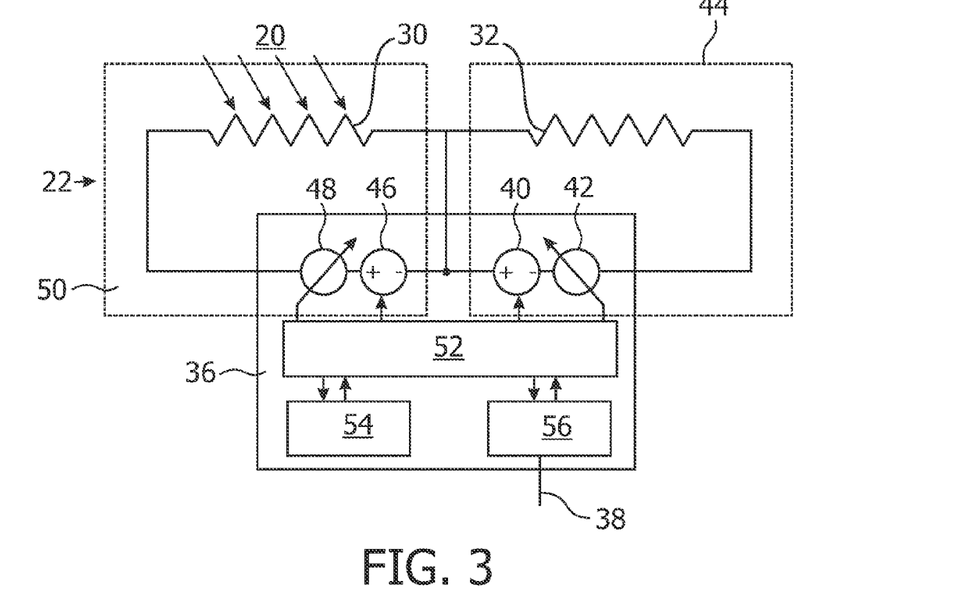
FIG. 3 shows a circuit diagram of the dosage sensor of FIG. 2.

FIG. 3 shows a partly schematic circuit diagram of the first and second electrical component 30, 32, connected to the evaluation circuit 36.

The first, resistive electrical component 32 forms together with a first controllable voltage source 40 and a current sensing device 42 a first sensor arrangement 44, whereas the second, UV light sensitive component 32 forms together with a second voltage source 46 and a second current sensor 48 a second controllable sensor arrangement 50.

A control unit 52 is provided for controlling the operation of the first and second sensor arrangements 44, 50 and for processing the values delivered from the current sensing devices 42, 48. The control unit 52 acts as dosage calculation unit and also interacts with a data storage 54 and a communication interface 56 to store sensor data and to transmit such data over the cable connection 38 (or, in alternative embodiments, other means of communication that the communication unit 56 is adapted for, e.g. radio or optical data transmission).

In operation of the sensor 22, the control unit 52 continuously controls the first and second sensor arrangement 44, 50 to measure both flow speed of the fluid 18 and intensity of incident UV light 20.

To measure UV intensity, the control unit 52 drives voltage source 46 to supply a constant voltage. The resulting current through the photo resistor 30 is measured by current sensor 48. From the known calibration data of photo resistor 30, which may be stored in storage device 54, the control unit 52 thus determines a present value for the intensity of UV light 20. The measurement value thus obtained is stored in storage 54.

In a subsequent step, or in parallel, the control unit 52 controls the first sensor arrangement 44 to measure the flow speed of the fluid 18 using the anemometric measurement principle. This measuring principle relies on a thermal model of the first electrical components 32 within its environment.

Figure 10:
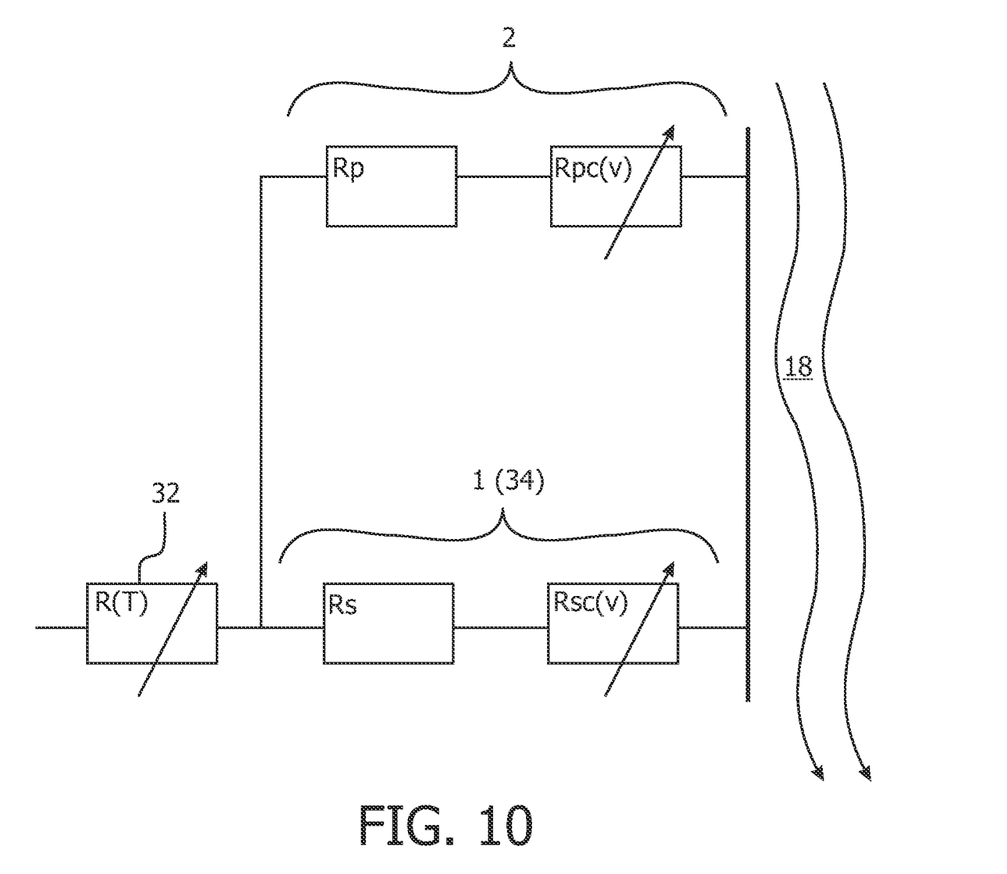
FIG. 10 shows a schematical representation of a thermal model used for measuring flow speed.

In the model of FIG. 10, the electrical component 32 is thermally connected to the fluid 18 by two parallel paths: A first path 1 representing thermal conduction via the heat conduction element 34 and a second path 2 representing parasitic thermal paths from the component 32 to the fluid 18, e.g. via the housing 24. The first path is used as a model for sensing the flow speed, whereas the second path 2 represents a systematic error in the simplified model used.

Both the first and the second path 1, 2 consist of a constant thermal resistance between the electrical component 32 and the fluid 18 and a flow speed dependent thermal resistance. In the first path 1, Rs designates a thermal resistance from the resistive electrical component 32 to the surface of heat conduction element 34 in contact with the fluid 18. Rsc(v) represents a flow speed dependent thermal resistance. Likewise, in the second path 2, Rp designates a parasitic thermal resistance between the resistive electrical component 32 and the housing 24, whereas Rpc(v) is a flow speed dependent thermal resistance representing a parasitic thermal resistance.

The anemometric principle relies on sensing the flow speed dependent change of the total thermal resistance from the resistive electrical component 32. This information is evaluated in a simplified model regarding only the first path 1 with a constant part Rs and a flow speed dependent part Rsc(v). Since the constant part may easily be eliminated in evaluation of measurements obtained, the sensing information is thus mainly included in Rsc(v).

The parasitic thermal conduction via the second path 2, which represents a systematic error, should thus be small against the conduction via the first path 1; otherwise, the measurement obtained will be determined to a large part by parasitic thermal flow.

Accordingly, the thermal resistance Rs represented by direct heat conduction via the heat conduction element 34 should be much smaller than the parasitic thermal resistance Rp. This is preferably realized by providing good heat conduction via the heat conduction element 34, while otherwise minimizing heat flow from the resistive electrical component 32. Most preferably, the thermal insulation of the component 32 and the thermal conduction between the component 32 and the fluid 18 should be chosen such that Rp is more than 10 times Rs. Thus, if e.g. Rs is in the order of 1 K/W, then Rp should be at least 10 K/W.

Stored within the programming of the control unit 52, or within data storage 54, are tables reflecting the temperature dependence of the electrical resistance of the electrical resistive device 32, i.e. the relation R(T), with R the electrical resistance in Ohm and T the temperature in K. Further known and stored is the dependency of thermal resistance Rth (in Kelvin per Watt) of the resistive electrical device 32 as a function of the flow speed v (in meters per second) of the fluid 18. This dependency, Rth (v) has been obtained from prior measurements or from model calculations.

For measuring the flow speed v of the fluid 18, the sensor arrangement 44 is first controlled to measure the temperature T of the resistive electrical device 32 (and thus the temperature of the fluid 18) by applying a small voltage at the voltage source 40 and measuring the resulting small current through the resistor 32 in the current sensor 42. In this context, "small" means that the total electrical energy input to the resistor 32 only leads to negligible self-heating. Ohms law U=R*I is used to determine the electrical resistance R of resistor 32, which in turn is used to determine, by using the described look-up table for the dependency R(T), the internal temperature of the resistor 32. Due to the good thermal contact, this value corresponds to the temperature of the fluid 18.

In a subsequent step, a constant electrical input power P is applied to the resistor 32 to generate a small but well detectable temperature increase. The electrical power applied is known from the voltage of the voltage source 40 and the current measured at the current sensor 42. This power P is applied for a period of time until the resistor 32 has stabilized at a higher temperature.

The increase in temperature at the resistor 32 follows the well-known equation $\Delta T=Rth*P$, with $\Delta T$ the temperature difference, Rth the thermal resistance and P the applied electrical power.

By next measuring the temperature of the heated resistor 32, which again is effected by using Ohms law and the known temperature dependency of the electrical resistance, the thermal resistance Rth can be calculated.

As explained with regard to FIG. 10, in a simplified model disregarding parasitic influences, the total thermal resistance Rth between the resistor 32 and the fluid 18 can be expressed as a constant contribution Rs corresponding to thermal conduction from the resistor 32 to the fluid stream 18, and a second, flow speed dependent contribution Rsc(v), which describes a thermal contact resistance between the heat conduction element 34 and the fluid 18. Thus, Rth(v)=Rs+Rsc(v), where the first constant part Rs describes the inner thermal resistance and Rsc(v) the outer thermal resistance determined by flow speed v and the type of the process fluid, e.g. water or air.

To achieve a strong dependence of the thermal resistance Rth on the flow speed v, it is advantageous to make the inner thermal resistance Rthi as small as possible. This may be achieved by mounting the resistor 32 in good thermal contact with the fluid, e.g. directly onto a metallic housing, or by bridging the resistor 32 to the fluid 18 with a material of high thermal conductivity, such as the copper heat conduction element 34.

By applying the above measurement procedure, the control unit 52 controls the first sensor arrangement 44 to continuously obtain measurements of the flow speed v which are stored in data storage 54.

To obtain a dosage value, a local dosage D is calculated from the obtained values of the flow speed v and of the measured UV irradiance I as well as from the size of the sensor surface (specifically, the length d of the surface measured in the flow direction) as follows:

$$D=I*d/v.$$

To obtain a value for the local dosage D in $J/m^2$, an UV irradiance I is measured in $W/m^2$, the length of the measurement area d in m, and the flow speed v in m/s. To obtain exact measurements, calibration of both the flow speed and UV irradiance sensor parts are recommended.

The above given formula of course simplifies matters by relying on the assumption that neither flow speed v nor irradiance level I vary significantly over the detector area, and the flow speed v is directed parallel to the surface area of the sensor 22. These assumptions will hold for a suitable mounting of the sensor 22 in such a way that neither flow pattern of the fluid 18 nor an UV irradiance pattern are distorted.

To obtain a total dosage value, the continuously acquired local dosage values D are integrated (or, for discrete values continuously measured in preferably equal time intervals, summed up) over time.

Either the thus obtained total dosage value, or individual measurements of intensity and/or flow speed are stored in storage 54 and may be communicated over communication interface 56.

Figure 4:
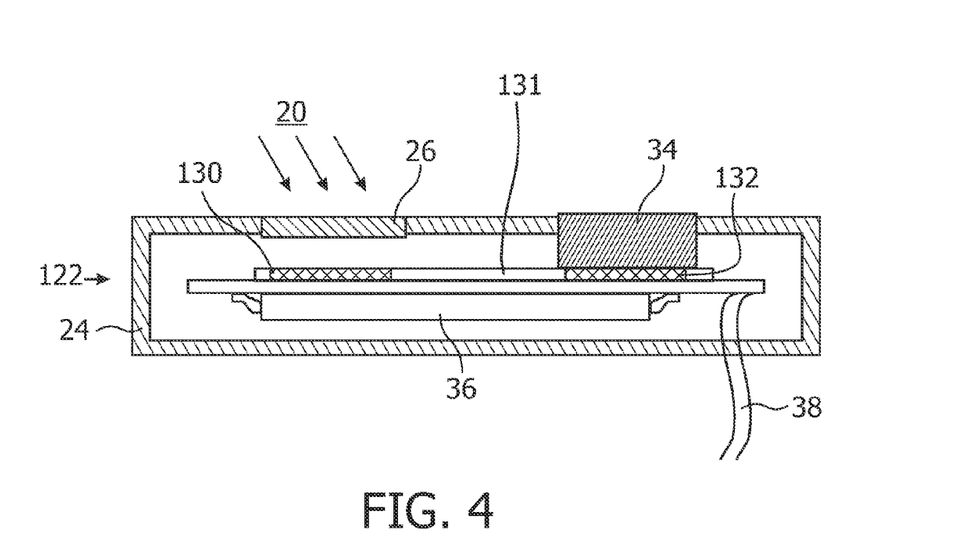
FIG. 4 shows a schematical cross-sectional view of a second embodiment of a dosage sensor.

FIG. 4 shows an alternative embodiment of a sensor 122. The sensor 122 according to the second embodiment corresponds in some parts to the sensor 22 according to the first embodiment. Like parts are referred to by like reference numerals. In the following, differences between the second and first embodiment will be explained.

In the sensor 122 according to the second embodiment, a first resistive electrical component is provided as a diode 132. A UV light sensitive electrical component is provided as a photo diode 130.

The photo diode 130 and the diode 132 are produced together as a monolithic sensor element, formed on a common substrate 131 in the same manufacturing process. The diodes are made by semiconductor processing (thin film) technologies, where the device properties are formed during film deposition and vacuum technologies are used to apply or structure deposited layers in known fashion. (Photo)diodes have a PN junction and thus spatially separated regions of different majority charge carrier concentrations or types. In photo diode devices, an incident photon stream is measured by the photo current under zero bias or reversed bias of the junction.

The type of material for the photo diode 130 depends on the spectral composition of the incident light 20. For detection of UVC irradiation, wide band gap semi-conductive materials are preferred: SiC or GaP for example for heterogeneous semi-conductive irradiance detectors, and Si for detection of longer wavelengths.

While it is possible to manufacture the diode 132 differently from the photo diode 130, the two electrical components may alternatively manufactured identically. As shown in FIG. 4, the diode 132 is shadowed from the incident UV light 20, such that its electrical properties are those of a diode.

Thus, the first and second electrical components 132, 130 may be manufactured as one monolithic detection element.

Figure 5:
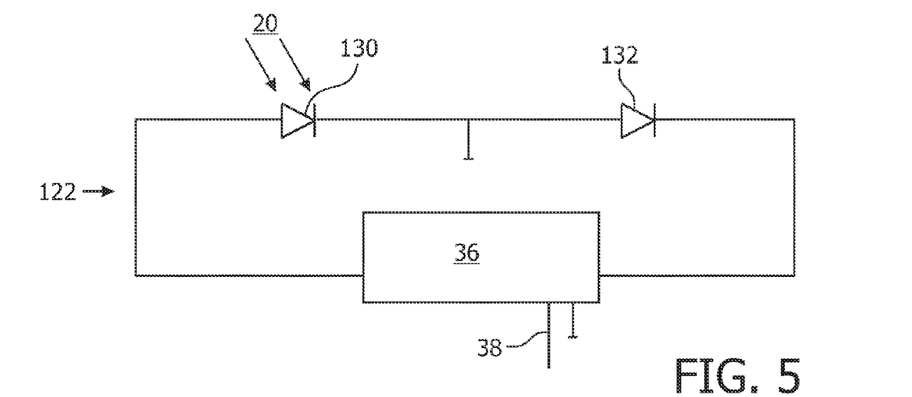
FIG. 5 shows a circuit diagram of the dosage sensor of FIG. 4.

The evaluation circuit 36 drives the sensor arrangements including the electrical components 132, 130 to obtain UV intensity and flow speed measurement in much the same way as described above in connection with the first embodiment. UV intensity in this case is determined from the photo current through photo diode 130. Flow speed v is again measured according to the anemometric measurement principle, utilizing the strong temperature dependency of the semi-conductor component 132. Then, the first diode 132 is used as a temperature dependent resistor driven in forward bias, whereas the second photo diode 130 is used for irradiance detection under zero or negative bias.

In further alternative embodiments (not shown), the electrical components 130, 132 may be photo transistors. In photo transistors the collector-base junction is exposed to incident light. The generated base current amplifies the collector current. For photo transistors sensitive to UV radiation, the same materials and manufacturing processes discussed above in connection with photo diodes may be used.

Thus, a monolithic detector may be made in one of the following ways:

Fabrication of two photo diodes or photo transistors on one substrate 131 by thin film processing, the first photo diode 132 (or, alternatively: photo transistor, not shown) being shadowed against the incident UV radiation 20, and the second photo diode 130 (alternatively: photo transistor, not shown) being exposed to the UV light.

Fabrication of two photo resistor elements (not shown) on one substrate by thin film or thick film processing, the first photo resistor used as resistive electrical device 32 shadowed against the UV light 20 and the second photo resistor used as UV sensitive component 30 exposed to the UV light.

Mounting of two discrete surface mount device (SMD) photo diodes (or photo transistors, or photo resistors) on a substrate, a first irradiated and the second shadowed against the UV light 20.

In all of these cases, the UV intensity level is directly determined from the photo current or photo resistance reading, whereas the flow speed is determined by determination of the process fluid temperature, heating of the resistive component and again determination of internal temperature, and calculation of the flow speed from the temperature difference, known electrical input power and known flow speed dependent thermal resistance.

Figure 6:
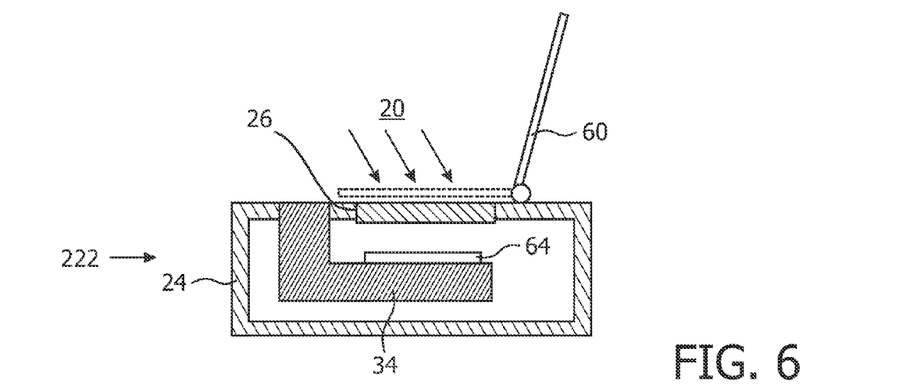
FIG. 6 shows a schematical cross-sectional view of a third embodiment of a dosage sensor.

A third embodiment of the invention is shown in FIG. 6. Again, a sensor 322 according to the third embodiment has parts in common with the first and second embodiments, which are designated by like reference numerals. In the following, differences will be explained.

In this embodiment, only a single electrical component 64 is provided as sensor element for both UV intensity measurements and flow speed measurement. In the preferred example, this component is a photo diode 64 manufactured in thin film technology on a substrate. The photo diode 64 is arranged within housing 24 such that its exposure to UV light 20 may be selectively shielded by a mechanically movable shutter 60. Depending on the position of the mechanically movable shutter 60, the photo diode 64 is either exposed to the UV light 20 from the fluid 18, such that it may be used to measure UV intensity in the manner described above. Or, the photo diode 64 is completely shielded from the UV light 20, such that it behaves as a normal diode. Due to good thermal coupling to the fluid 18 via the heat conduction element 34, it may thus be used to measure flow speed of fluid 18 in the same manner as described above.

Thus, the photo diode 64 forms part of both a first sensor arrangement for sensing the flow speed of the fluid 18 and of a second sensor arrangement for measuring intensity of the UV light 20. An evaluation unit (not shown) drives the photo diode 64 and the movable shutter 60 accordingly, such that in turn measurements of UV intensity and flow speed are taken.

Figure 7:
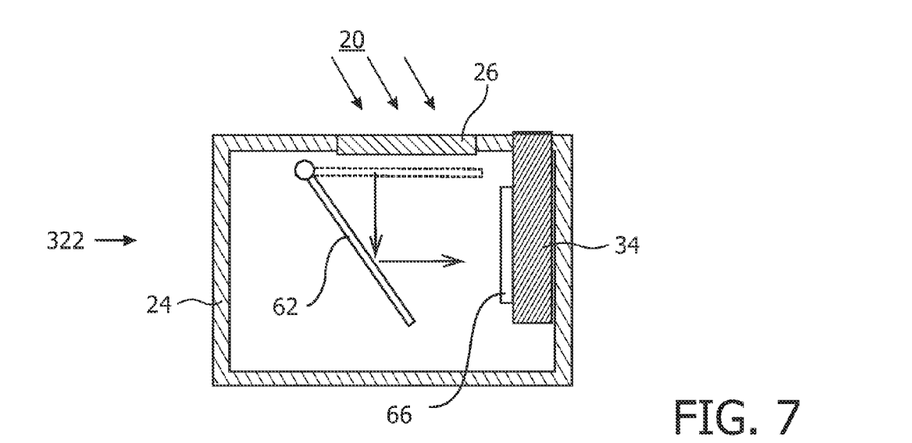
FIG. 7 shows a schematical cross-sectional view of a fourth embodiment of a dosage sensor.

FIG. 7 shows a further alternative fourth embodiment, comparable to the third embodiment shown in FIG. 6. In a sensor 322, a photo transistor 66 is arranged as electrical component of both a first and a second sensor arrangement. Instead of an external movable shutter 60 as in the third embodiment, the sensor 322 according to the fourth embodiment has a movable mirror 62, which in an upper position shields the photo transistor 66 from the incident UV light 20, and in a lower position, as shown in FIG. 7, directs the UV light 20 onto the photo transistor 66. Operation of the sensor 322 according to the fourth embodiment is the same as of the sensor 222 according to the third embodiment.

In a further alternative embodiment comparable to the third and fourth embodiments described above, a sensor has a resistive electrical component in thermal contact with the fluid that is also light sensitive, e.g. a phototransistor, photodiode or photoresistor (not shown). In contrast to the above described third and fourth embodiments, no controllable shading device, such as a shutter or mirror is provided. Instead, evaluation of the sensor 22 is synchronized with operation of the lamp 16, such that UV emission from the lamp 16 is modulated (in the simplest case by turning the lamp 16 on and off, or by selectively shielding the fluid 18 from the lamp 16). Thus, different readings from the sensor 22 will be obtained depending on the intensity of UV light 20 emitted from the lamp 16. By comparison of the values obtained with different irradiation by the lamp 16, the influence of the UV irradiation on the sensor signal may be determined and thus eliminated from evaluation of the flow speed measurement. Consequently, in the alternative embodiment, a single component may be used for both irradiance and flow speed measurements without using a controllable shading device at the sensor 22.

Figure 8:
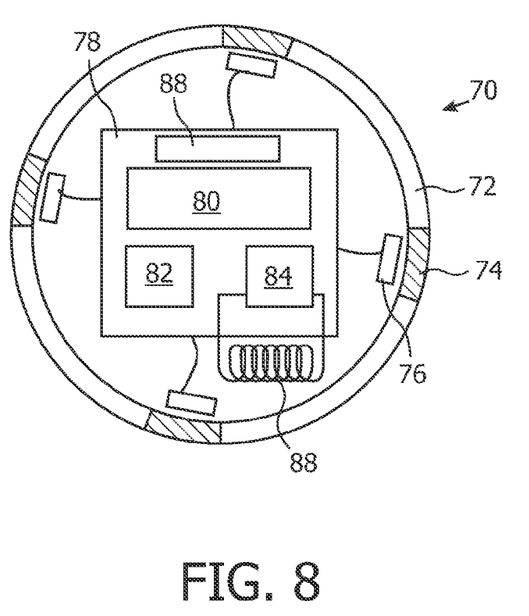
FIG. 8 shows a schematical diagram of a fifth embodiment of a dosage sensor.
Figure 9:
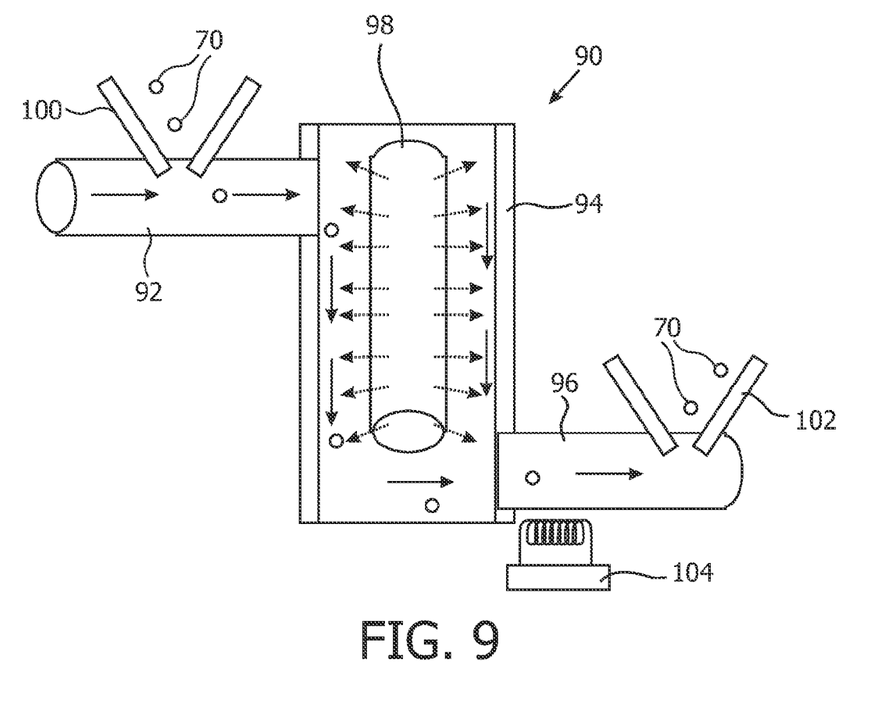
FIG. 9 shows a schematical representation of a UV treatment device.

FIG. 8 shows a sensor 70 according to a fifth embodiment of the invention. As shown in FIG. 9, the sensor 70 may be used in a UV water treatment system 90 to sense the UV dosage of the water treated.

The sensor 70 has generally spheroidal shape and comprises a housing 72 sealing the interior against the fluid. Within the housing, a plurality of windows 74 are arranged which are UV transparent, and UV sensor components 76 are arranged behind the windows 74 to be irradiated with UV light through the windows 74.

The sensor components 76, which are in a preferred embodiment photo diodes, are each connected to an evaluation unit 78. The evaluation unit 78 comprises a control unit 80, which is preferably a microcontroller, a data storage 82, which is preferably a random access memory or a flash memory, and a communication unit 84 for communication with the outside. In the preferred embodiment shown, the communication unit 84 is connected to a coil 86 to be used for wireless radio communication or inductive coupling, as will be further explained.

The sensor 70 further comprises a battery 88, which is preferably a rechargeable battery, to electrically supply all components inside the housing 72. Thus, the sensor 70 is completely autonomous to perform its UV dosage measuring functionality without external connection.

In operation, the control unit 80 of evaluation unit 78 continuously acquires sensor readings from the UV sensor components 76 and processes these values digitally to calculate and store a UV dosage value. The resulting UV dosage is stored in storage 82.

At the start of measurement, the stored dosage value is set to zero by a reset command received via communication unit 84.

Then, the intensity values from all sensors 76, arranged to cover a broad range of spatial directions, are recorded in measuring intervals, and a corresponding dosage value, calculated from the measured intensity and the time duration of the measurement interval, is added to the dosage value previously stored in storage 82. The steps of measuring, adding and storing are continuously repeated, such that at each time the dosage value stored in storage 82 reflects the total UV dosage received by the sensor 70 since the start of the measurement.

As shown in FIG. 9, a plurality of identical sensors 70 may be used to ascertain the proper function of a UV treatment plant 90. In the plant 90, water to be treated is fed to a reactor 94 through a first duct 92. In the reactor 94, the water is irradiated by a powerful UV lamp 98. The water thus treated is guided through a second duct 96.

In order to measure UV dosage received by the water, a sensor inlet 100 and a sensor outlet 102 are provided, where a plurality of sensors 70 as described above are inserted into the water stream in the first duct 92, pass through the reactor 94 and are extracted from the water in the second duct 96. The sensors 70 are adapted to the fluid they are destined to be operated in, in the present case water. Thus, they are provided in a size and weight such that their specific weight is closely equal to that of the fluid. As such, they can float within the fluid. Preferably, the specific weight of the sensors 70 differs from that of the fluid by no more than 10%.

Further, the sensors 70 are adapted in size to the specific measuring task. Any system that is to be evaluated may generally be regarded as a channel, where at least one sensor 70 is inserted upstream and passes through the channel together with the fluid. The size of the sensor is chosen according to the characteristics of the channel, i.e. such that the sensor 70 is small enough to pass through the channel, and preferably is so far miniaturized that the flow of the fluid within the channel is largely undisturbed by the sensor 70 floating within the fluid.

For evaluation of the water treatment plant 90 of FIG. 9, the sensors 70 are inserted into inlet 100 with their storage 82 reset to zero. The sensors 70 then pass through the reactor 94 and acquire an UV dosage from the UV lamp 98, which is dependent on factors such as their path through reactor 94 and the flow speed of the water.

After passing through the reactor 94, the sensors are extracted at outlet 102. However, prior to the outlet 102, they pass by a data reader 104 comprising a coil, which is used for wireless communication with the sensor 70 via the internal communication unit 84 of the sensor 70 and its associated coil 86. The reader 104 generates a time-variant electromagnetic field comprising a query command that is sent to each sensor 70 passing by. The communication unit 84 within each sensor 70 receives the command and accordingly prompts the control unit 84 to retrieve from storage 82 the current UV dosage value. The control unit 80 sends via communication unit 84 and coil 86 a response message as a modulated time-variant electromagnetic field to be received at reader 104, such that the value of the accumulated UV dosage is thus read out at the reader 104.

As shown in FIG. 9, besides the possibility of using a single sensor 70, also multiple sensors may be inserted into the fluid stream. Preferably, sensors 70 are inserted multiple times, where each time the accumulated UV dosage value is read out (and the sensor 70 reset afterwards). Thus, not only single dosage measurements may be obtained, but especially statistical data, such as a mean exposure, and, especially important for evaluation of the system 90, minimum dosage values.

Regarding the above embodiments of the present invention, the skilled person will appreciate that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting, but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language, not excluding other elements or steps). Any reference signs in the claims should not be construed as limiting the scope of the claims or the invention.

The mere fact that certain measures are recited in mutually different dependent claims or different embodiments does not indicate that a combination of these measures cannot be used to advantage.

The invention claimed is:

1. A device for determining a dosage of UV light passing through a fluid stream, said device including:
    a housing having a UV-transmissive window;
    a first sensor for measuring a flow speed of said fluid stream, said first sensor including a first electrical component arranged in the housing for thermal contact with said fluid stream, said first electrical component having a temperature dependent resistance;
    a second sensor for measuring an intensity of the UV light passing through said fluid stream, said second sensor including a second electrical component arranged in the housing for irradiation by said UV light received through the UV-transmissive window, said second electrical component having a resistance sensitive to the intensity of said UV light; and
    a control unit electrically connected to said first and second sensors for determining said dosage from the measurements of said sensors.

2. A device according to claim 1, where both of said first and second electrical components are made by thick film technology, thin film technology, or provided as an SMD component.

3. A device according to claim 1, where both of said first and second electrical components comprise one of the following types of electrical component: photo diode, photo transistor, photo resistor.

4. A device for determining a dosage of UV light passing through a fluid stream, said device including:
    a housing having a UV-transmissive window;
    a sensor for measuring both a flow speed of said fluid stream and an intensity of the UV light passing through said fluid stream, said sensor including an electrical component arranged in the housing for both thermal contact with said fluid stream and irradiation by said UV light received through the UV-transmissive window, said electrical component having a resistance that is both temperature dependent and sensitive to the intensity of UV light; and
    a control unit electrically connected to said sensor for determining said dosage from the measurements of said sensor.

5. A device according to claim 4 comprising a controllable shading device arranged in the housing such that:
  when operated in a first mode said electrical component is exposed to the UV light received through said window;
  when operated in a second mode said electrical component is shielded from the UV light received through said window.

6. A device according to claim 1 where said first sensor is operative to measure said flow speed from a cooling rate of said first electrical component by said fluid stream upon electrical heating of said first electrical component.

7. A device adapted for traveling within a fluid stream and determining a dosage of UV light irradiating said fluid stream, said device comprising:
  a sealed housing having a plurality of UV-transmissive windows facing in different spatial directions;
  a plurality of UV sensor components, each disposed in said housing for sensing an intensity of UV light irradiation received through a respective one of said windows;
  a control unit electrically connected to said UV-sensor components for determining the dosages of UV light received by said sensor components; and
  a communication unit for wirelessly transmitting data relating to said dosages to an external data reader.

8. A device according to claim 7 where said sealed housing has a spherical shape.

9. A device according to claim 7, said device having a specific weight that differs from the specific weight of the fluid stream by no more than 10%.

10. A device according to claim 7, said device comprising a coil for generating a voltage for providing power to the device when traveling through a time-variant electromagnetic field provided from the exterior of said device.

11. A method for determining a UV dosage of UV light irradiating a fluid stream, said method comprising:
  guiding the fluid stream through a channel in which UV irradiation is provided;
  inserting a device according to claim 7 into said fluid stream to flow therewith through said channel;
  determining by said device the dosages of UV light received in passing through said channel; and
  wirelessly transmitting the data relating to said dosages to an external data reader.

12. A method according to claim 11 where a plurality of the devices according to claim 7 are inserted into said fluid stream, or one or more of said sensing devices is inserted into said fluid stream multiple times.

* * * * *